Dec. 25, 1956  L. N. HERMANN  2,775,284
MACHINE FOR MAKING ARCHED PANEL SHEETS
Filed Jan. 21, 1953  5 Sheets-Sheet 2

INVENTOR.
LEROY NICKOLAS HERMANN
BY
Harry H. Hitzman
ATTORNEY.

Dec. 25, 1956     L. N. HERMANN     2,775,284
MACHINE FOR MAKING ARCHED PANEL SHEETS
Filed Jan. 21, 1953     5 Sheets-Sheet 3

INVENTOR.
LEROY NICKOLAS HERMANN
BY
Harry N. Hitzeman
ATTORNEY.

Dec. 25, 1956 L. N. HERMANN 2,775,284
MACHINE FOR MAKING ARCHED PANEL SHEETS
Filed Jan. 21, 1953 5 Sheets-Sheet 4
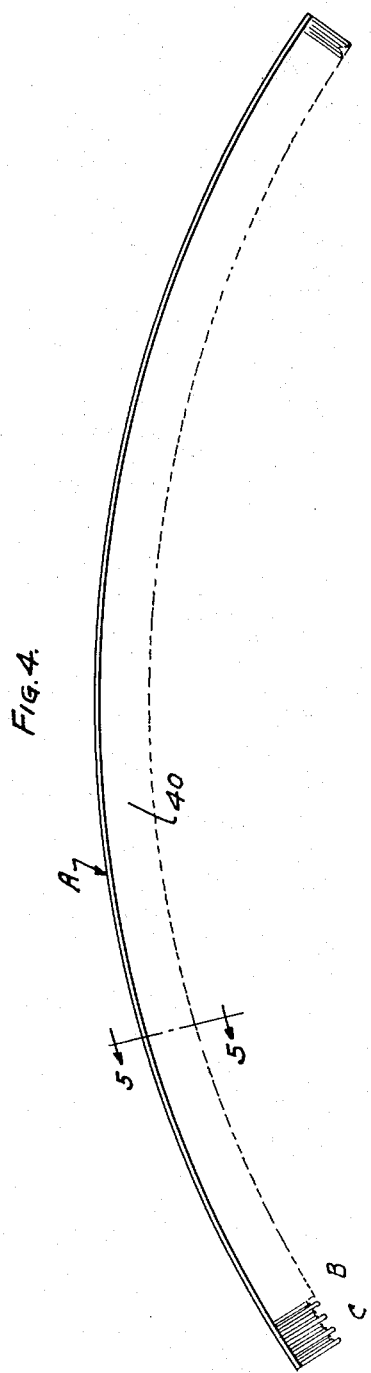
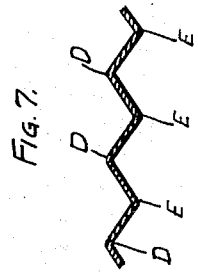
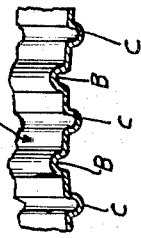
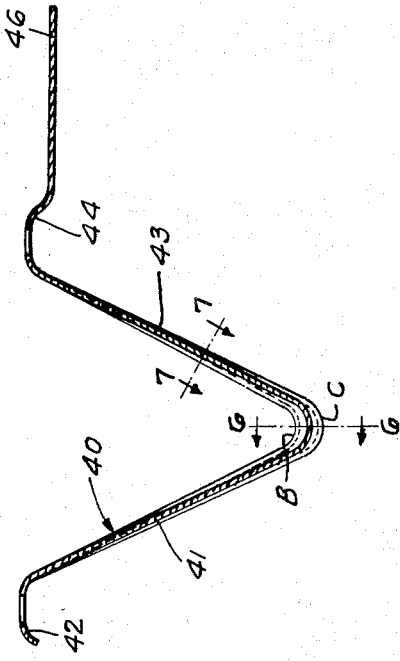
INVENTOR.
LEROY NICKOLAS HERMANN
BY
Harry H. Hitzeman
ATTORNEY.

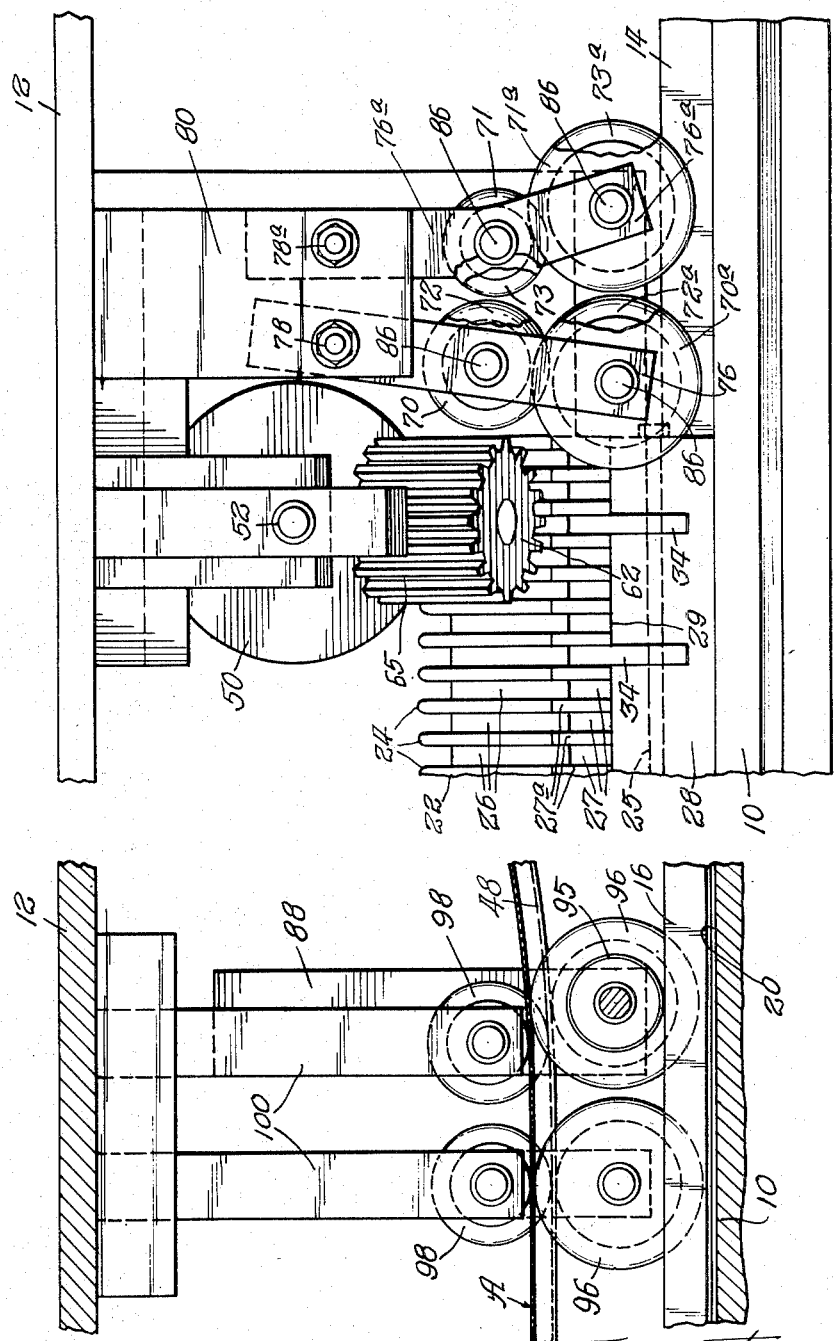

United States Patent Office 2,775,284
Patented Dec. 25, 1956

2,775,284

MACHINE FOR MAKING ARCHED PANEL SHEETS

Leroy N. Hermann, Chicago, Ill., assignor to Inland Steel Products Company, a corporation of Delaware Application January 21, 1953, Serial No. 332,283

11 Claims. (Cl. 153—7)

My invention relates to a machine for making arched panel sheets.

My invention relates more particularly to a machine for forming elongated rectangular sheet metal blanks into arched or curved panel sheets for use in making prefabricated buildings.

The principal object of the present invention is to provide improved mechanism for easily and quickly forming a curved reinforced sheet metal building panel from an elongated rectangular blank of sheet metal.

A further object of the invention is to make a machine of the type described which may be used in cooperation with the standard bed and tool holder of a metal cutting planer.

Metal cutting planers of the type to which I refer are usually provided with a stationary tool holder and a horizontally reciprocating bed or work holding platform which moves back and forth below the stationary tool holder so that tools held therein may operate upon work fastened to the reciprocating bed as the work is being moved back and forth.

In carrying out the objects of this invention I prefer to mount suitable rolling dies both on the bed of the planer and to the stationary tool holder, the rolling dies being capable of operating upon an elongated rectangular blank placed upon the bed to form the same into a curved or arcuate panel, the panel also being provided with a longitudinal V-shaped brace throughout its length. Means are also provided for effecting corrugations or ribs in the V-shaped reinforcing brace which is made in the sheet as it is being fed forward between the rolling dies.

A further object of the invention is to provide in a machine of the type described adjusting means for the forming dies or rollers so that the sheets may be arced to a desired radius for the type of building to which they are to be adapted.

A further object of the invention is to provide a machine of the type described which is capable of forming arcuate reinforced panels in a continuous process, the flat blanks being placed upon the planer bed at the beginning of its forward movement and removed therefrom in finished form at the end of its forward movement.

For a more comprehensive understanding of the invention and one form of machine for carrying out the objects of the same, reference is had to the following specification and the accompanying drawings, upon which:

Fig. 4 is a side elevational view of one of the preformed braced panel sheets produced by this machine;

Fig. 5 is an enlarged fragmentary section taken through the V-shaped ridge of the same on the line 5—5 of Fig. 4;

Fig. 6 is a cross-sectional view through the apex of the ridge taken on the line 6—6 of Fig. 5;

Fig. 7 is a similar cross-sectional view through one of the legs or side walls of the V-shaped ridge taken generally on the line 7—7 of Fig. 5;

Fig. 8 is a fragmentary vertical sectional view taken generally on the line 8—8 of Fig. 1; and Fig. 9 is a partial side elevational view, partly cut away, of the machine without a panel positioned on the formers and dies.

Figure 1:
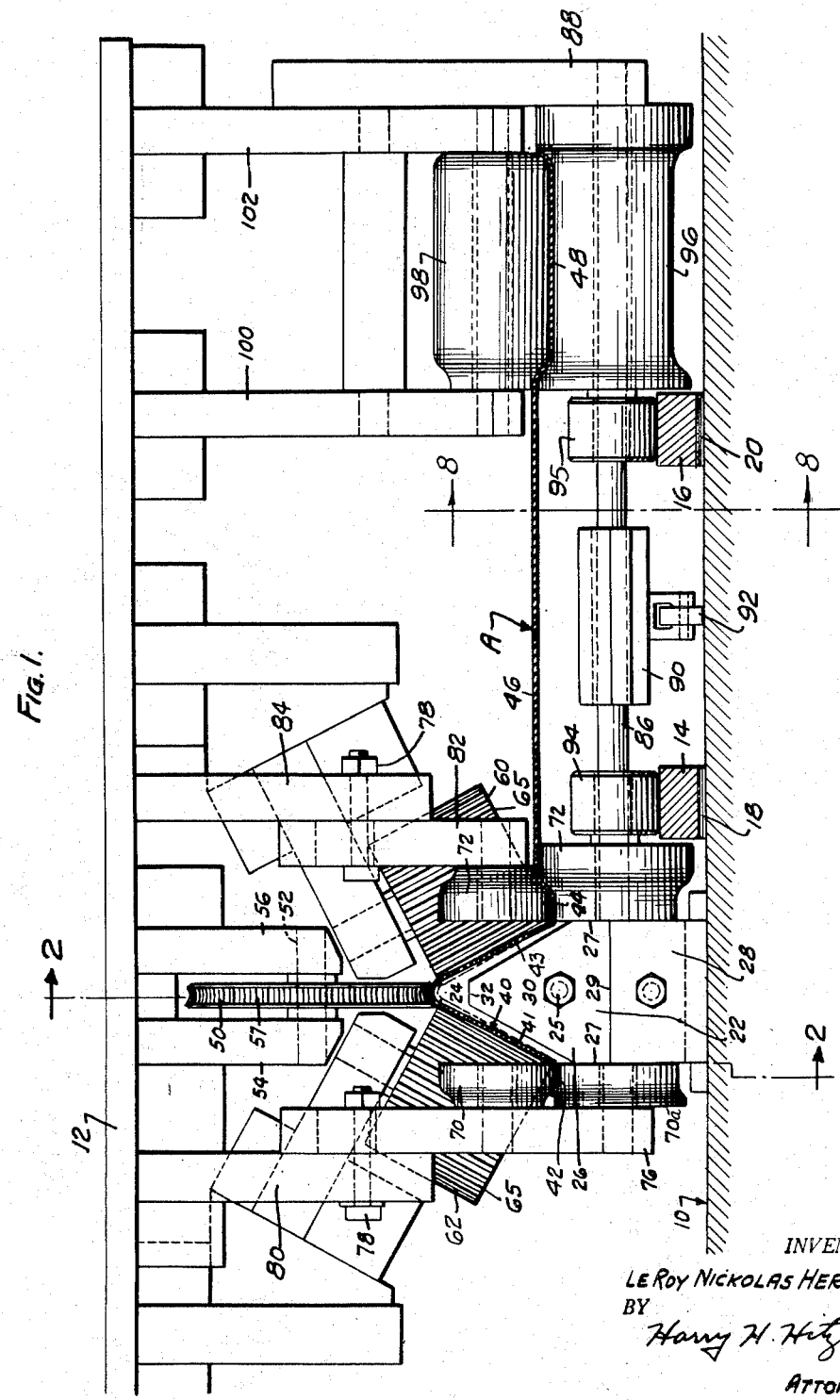
Fig. 1 is a fragmentary sectional view through a standard metal cutting planer and tool holder therefor showing the roller dies and other formers which I employ, taken generally on the line 1—1 of Fig. 2.
Figure 2:
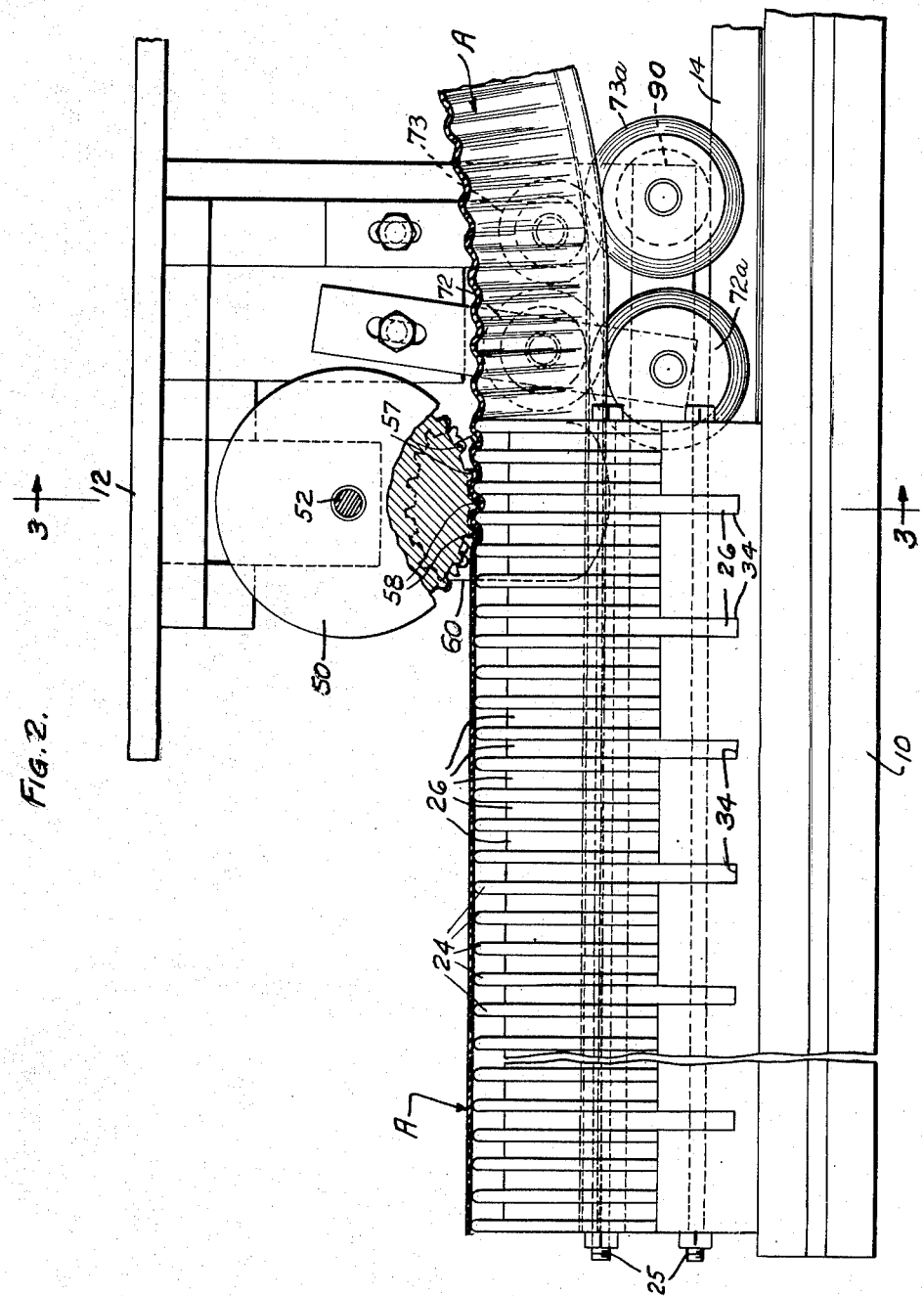
Fig. 2 is a cross-sectional view thereof taken generally on the line 2—2 of Fig. 1.
Figure 3:
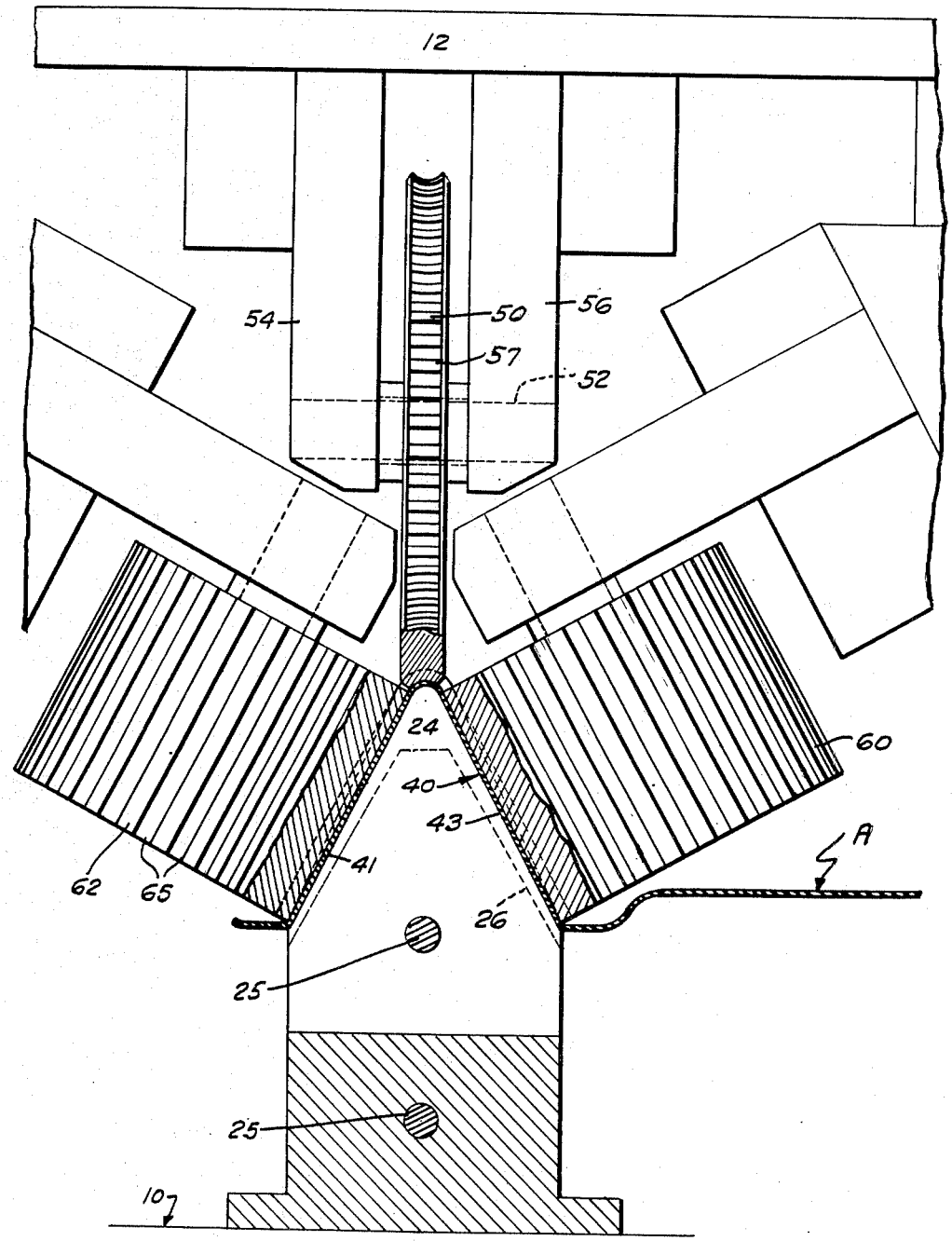
Fig. 3 is a vertical sectional view through a portion of the machine taken generally on the line 3—3 of Fig. 2.

In the embodiment of the invention which I have chosen to illustrate and describe the same, it has been shown as adapted to use with a metal cutting planer of the type which has a horizontally reciprocal bed 10 and a stationary tool holder 12 adjacent one end of the same. The bed 10 may have a pair of tracks 14 and 16 disposed thereon throughout its length, the tracks being adjustable to raise or lower the same by means of shims 18 and 20 in the usual manner. A triangularly shaped forming die 22 may be fixedly secured to the bed, the forming die having secured thereto by means of elongated bolts 25 a plurality of plates 24 and 26. The plates 24 have vertical parallel side walls 27a. Each of the plates 26 may be generally triangular in shape with parallel side walls 27 and a flat base 29 to rest upon the upper part of a frame 28, the upper end 30 of each of the plates 26 being triangular and having a flattened upper end 32, as shown. Each of the plates 24 may be similarly shaped but extending higher than the plates 32, and having its peak or apex formed in a radius, as shown.

At desired intervals the plates 26 may have a somewhat deeper base so that the same may be nested in suitable slots 34 in the frame 28 for the die 22. Thus, when a sufficient number of alternate plates 24 and 26 are secured together by the bolts 25 in the forming die 22, a forming die of the desired length is formed. The die may be suitably fastened to the bed or traveling carriage of the machine.

Building panels A are adapted to be placed upon the bed or traveling carriage. These building panels are preformed with the V-shaped ridge 40, the beads 42 and 44 upon both sides of the same, the flat wall portion 46 and the brace engaging edge 48. As they are fed forward on the traveling bed or carriage 10, the forward edge of the apex of the V-shaped ridge 40 resting upon the alternate ridges and slots of the forming die formed by the triangularly shaped members 24 and 26, is engaged at the apex by a rotatable forming die 50. The forming die 50 is mounted upon a shaft 52 in a pair of brackets 54 and 56 suspended from the stationary frame or tool holder 12. The forming die 50 may be in the form of a spiral gear having arcuately shaped spaced teeth members 57 which are adapted to engage the apex of the ridge 40 of the panel A, and as it passes beneath the same deform or form downwardly depending grooves or crimps 58 in the apex of the ridge 40.

Simultaneous with this operation, a pair of angularly disposed cylindrical forming dies 60 and 62 engage the legs 41 and 43 of the ridge 40, the forming dies 60 and 62 being provided with peripheral ridges or teeth 65 which engage the side walls 41 and 43 and form elongated grooves in the legs of the ridge 40. The dies 60 and 62 may be driven if desired. As best shown in Fig. 1, the forming dies 60 and 62 are disposed at an angle to the legs 41 and 43 of the V-shaped ridge so that a tapered groove is formed in the same, the greatest depth of the groove being adjacent the groove 58 formed by the die 50, the groove gradually tapering to a vanishing point at the end of the legs 41 and 43.

After the crimping operation, the panel A will be arced somewhat but can be further arched by use of guide rollers. Thus, as the panel A moves forward it can pass between four sets of rollers, two sets of rollers being disposed upon each side of the forming die 22. Fig. 9 shows the set of rollers 70, 70a carried by a bracket 76 which is mounted for vertical adjustment by means of a bolt member 78 in a fixed bracket 80 attached to the frame 12 of the machine. Rollers 72, 72a are on the other side of the die 22 and are complementary to rollers 70, 70a as shown in Figs. 1 and 9. Rollers 71, 77a are carried by bracket 76a fixed for adjustment by bolt 78a. Complementary to rollers 71, 77a are the rollers 73, 73a on the other side of the die 22. Both sets of rollers 70, 70a and 71, 71a are on one side of the die 22 while both sets of rollers 72, 72a and 73, 73a are on the other side of the die. The upper roller 72 is also mounted for vertical adjustment in a bracket 82 supported by a fixed bracket 84 to the frame 12. The lower rollers 72a and 73a are mounted for rotation on shafts 86 which are rigidly supported in an end bracket 88 connected to the frame 12 and a bracket 90 connected to the front stationary part of the machine and supported upon the movable carriage or bed 10 by a roller 92. The shafts 86 also carry a pair of rollers 94 and 95 which ride upon the tracks 14 and 16.

When a preformed panel A of a desired length has been placed upon the carriage or bed 10 with the triangular ridge 40 disposed over the forming die 22 and is moved forward, the dies 50, 60 and 62 will form crimps or tapered grooves in the legs 41 and 43 of the ridge. Immediately following this, the guide rollers 70, 70a; 72, 72a; 71, 71a and 73, 73a, according to their setting, effect a curvature of the panel A to a desired radius. The extreme edge of the panel A, including the portion 48 thereof, is guided in the arcuate movement of the same by means of suitable sets of, guide rollers 96 and 98 (see Fig. 8), the rollers 96 being journalled on the shafts 86 and the rollers 98 being supported in suitable brackets 100 and 102 suspended from the frame 12.

By this operation, therefore, a series of oppositely facing grooves B and C (see Figs 5 and 6) are provided throughout the length of the V-shaped brace 40. The metal is also formed so that the grooves B and C terminate in peaked ridges D and E which taper to a comparatively flat space adjacent the beads 42 and 44 (see Figs. 5 and 7). By the forming operation which is thus effected, the sheets are not only curved to the exact radius desired, but in addition, the V-shaped brace 40, by reason of the corrugations B and C at the peak of the brace and the ridges D and E which extend from this point to the sheet, is given unusual bracing strength.

From the above and foregoing description it can be seen that I have provided a machine for easily and quickly forming a curved sheet metal building panel with a triangularly shaped brace that is reinforced throughout its length by means of corrugations or ribs in the same so that unusual strength is provided in the bracing ridge.

I contemplate that changes and modifications may be made in the various details shown and I do not wish to be limited in any particular; rather what I desire to secure and protect by Letters Patent of the United States is:

1. A machine having a horizontally reciprocating bed and a stationary frame above said bed adjacent one end of the same, a sheet carrier mounted on said bed and reciprocal therewith, said sheet carrier having a longitudinally extending triangularly shaped forming die thereon, guide rollers disposed to grip a sheet on both sides of said forming die and hold the sheet thereon, said forming die having alternating ridges and slots throughout its length and rotatable forming rollers positioned on said stationary frame having peripheral teeth adapted to press a sheet metal blank having a V-ridge carried on said forming die between said alternate ridges to form crimps in the legs of the V-ridges of said blank.

2. A machine having a horizontally reciprocating bed and a stationary frame above said bed adjacent one end of the same, a sheet carrier mounted on said bed and reciprocal therewith, said sheet carrier having a longitudinally extending triangularly shaped forming die thereon, guide rollers disposed to grip a sheet on both sides of said forming die and hold the sheet thereon, said forming die having alternating ridges and slots throughout its length and rotatable forming rollers positioned on said stationary frame having peripheral teeth adapted to press a sheet metal blank having a V-ridge carried on said forming die between said alternate ridges to form crimps in the legs of the V-ridges of said blank, said machine having additional guide rollers forward of said forming rollers adapted to curve said blank to a desired radius.

3. A machine for crimping ridges in a preformed sheet having a V-shaped ridge throughout its length, said machine having a horizontally reciprocating bed and a stationary frame above said bed adjacent one end of the same, a sheet carrier mounted on said bed and reciprocal therewith, said sheet carrier having a longitudinally extending triangularly shaped forming die thereon, guide rollers disposed to grip a sheet on both sides of said forming die and hold the sheet thereon, said forming die having alternating ridges and slots throughout its length and a roller positioned on said stationary frame having peripheral teeth adapted to press the apex of said V-shaped ridge between said alternate ridges as a sheet is being fed forward therethrough.

4. A machine for crimping ridges in a preformed sheet having a V-shaped ridge throughout its length, said machine having a horizontally reciprocating bed and a stationary frame above said bed adjacent one end of the same, a sheet carrier mounted on said bed and reciprocal therewith, said sheet carrier having a longtudinally extending triangularly shaped forming die thereon, guide rollers disposed to grip a sheet on both sides of said forming die and hold the sheet thereon, said forming die having alternating ridges and slots throughout its length and a roller positioned on said stationary frame having peripheral teeth adapted to press the apex of said V-shaped ridge between said alternate ridges as a sheet is being fed forward therethrough, said machine also having angularly disposed rotatable forming rollers with peripheral ridges to form grooves in the legs of the V-shaped ridge of said preformed sheet.

5. Apparatus for working upon a preformed elongated rectangular sheet having a raised triangularly shaped ridge throughout its length, comprising a movable work carrier, a raised triangularly shaped forming die mounted on said carrier, said forming die being the length of the sheet to be worked, said forming die having alternate spaced humps and depressions throughout its length, a vertically disposed circular rotatable forming die positioned directly above the apex of said triangular die, means for moving said carriage forward to bring a sheet between said dies for forming alternate ridges and depressions in the apex of the triangularly shaped brace of said sheet and a set of guide rollers on each side of the triangular die adapted to receive the formed sheet as it is formed.

6. Apparatus for working upon a preformed elongated rectangular sheet having a raised triangularly shaped ridge throughout its length, comprising a movable work carrier, a raised triangularly shaped forming die mounted on said carrier, said forming die being the length of the sheet to be worked, said forming die having alternate spaced humps and depressions throughout its length, a vertically disposed circular rotatable forming die positioned directly above the apex of said triangular die, a pair of angularly disposed forming rollers having peripheral teeth aligned with said circular forming die for forming grooves in the legs of said triangularly shaped ridge, means for moving said carriage forward to bring a sheet between said dies for forming alternate ridges and depressions in the apex of the triangularly shaped brace of said sheet and a set of guide rollers on each side of the triangular die adapted to receive the formed sheet as it is formed.

7. Apparatus for working upon a preformed elongated rectangular sheet having a raised triangularly shaped ridge throughout its length, comprising a movable work carrier, a raised triangularly shaped forming die mounted on said carrier, said forming die being the length of the sheet to be worked, said forming die having alternate spaced humps and depressions throughout its length, a vertically disposed circular rotatable forming die positioned directly above the apex of said triangular die, means for moving said carriage forward to bring a sheet between said dies for forming alternate ridges and depressions in the apex of the triangularly shaped brace of said sheet, a set of guide rollers on each side of the triangular die adapted to receive the formed sheet as it is formed and means located forward of said forming die for curving said sheet to a desired radius.

8. Apparatus for working upon a preformed elongated rectangular sheet having a raised triangularly shaped ridge throughout its length, comprising a movable work carrier, a raised triangularly shaped forming die mounted on said carrier, said forming die being the length of the sheet to be worked, said forming die having alternate spaced humps and depressions throughout its length, a vertically disposed circular rotatable forming die positioned directly above the apex of said triangular die, means for moving said carriage forward to bring a sheet between said dies for forming alternate ridges and depressions in the apex of the triangularly shaped brace of said sheet, a set of guide rollers on each side of the triangular die adapted to receive the formed sheet as it is formed and means located forward of said forming die for curving said sheet to a desired radius, said means including fixedly mounted adjustable guide rollers.

9. Apparatus for working upon a preformed elongated rectangular sheet having a raised triangularly shaped ridge throughout its length, comprising a movable work carrier, a raised triangular shaped forming die mounted on said carrier, said forming die being the length of the sheet to be worked, said forming die having alternate spaced humps and depressions throughout its length, a vertically disposed circular rotatable forming die positioned directly above the apex of said triangular die, a pair of angularly disposed forming rollers having peripheral teeth aligned with said circular forming die for forming grooves in the legs of said triangularly shaped ridge, means for moving said carriage forward to bring a sheet between said dies for forming alternate ridges and depressions in the apex of the triangularly shaped brace of said sheet, a set of guide rollers on each side of the triangular die adapted to receive the formed sheet as it is formed and means located forward of said circular forming die for curving said sheet to a desired radius.

10. A machine as specified in claim 1 wherein the forming rollers are inclined to the triangularly shaped forming die to form tapered grooves in said sheet V-ridge.

11. Apparatus for working upon a preformed elongated rectangular sheet having a raised triangularly shaped ridge throughout its length, comprising a movable work carrier, a raised triangularly shaped forming die mounted on said carrier, said forming die being the length of the sheet to be worked, said forming die having alternate spaced humps and depressions throughout its length, a vertically disposed circular rotatable forming die positioned directly above the apex of said triangular die, a pair of angularly disposed forming rollers having peripheral teeth aligned with said circular forming die for forming grooves in the legs of said triangularly shaped ridge, said pair of forming rollers being inclined to the sides of said triangularly shaped die to form tapered grooves in said ridge, means for moving said carriage forward to bring a sheet between said dies for forming alternate ridges and depressions in the apex of the triangularly shaped brace of said sheet, a set of guide rollers on each side of the triangular die adapted to receive the formed sheet as it is formed and means located forward of said circular forming die for curving said sheet to a desired radius.

References Cited in the file of this patent

UNITED STATES PATENTS

| 626,617 | Kimberly | June 6, 1899 |

FOREIGN PATENTS

| 87,873 | Germany | Aug. 21, 1896 |